United States Patent Office 3,464,384
Patented Sept. 2, 1969

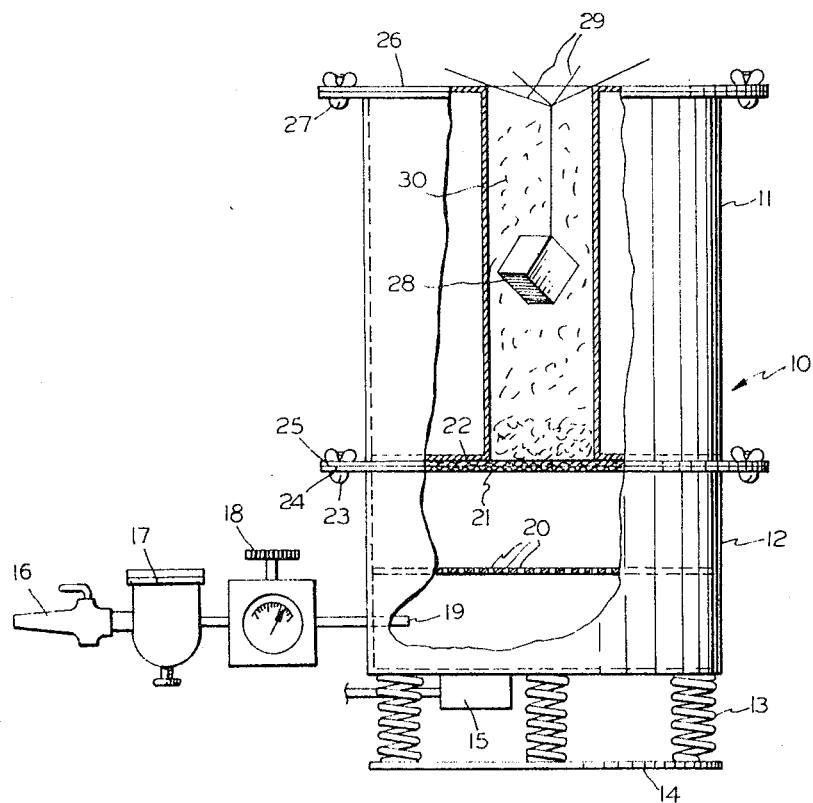

3,464,384
FLUIDIZED BED COATER
Harvey Miller, 715 S. Washington St. 22314, and Woodrow Thurston, 8906 Woodlawn Court 22309, both of Alexandria, Va.
Filed Aug. 28, 1967, Ser. No. 664,241
Int. Cl. B05c 3/04, 3/103
U.S. Cl. 118—429
2 Claims

ABSTRACT OF THE DISCLOSURE

This invention relates to fluidized bed coaters and, more particularly, to the improvements of providing a filter paper means to act as a disposable porous disc for dispersing the air and furnishing a uniform bed for support to resin particles, and of providing a series of spool shaped coating chamber size adjusting inserts whereby a minimum amount of resin particles can be used to meet the requirements of coating differently sized specimens.

---

The invention described herein may be manufactured and used by or for the Government of the United States of America for governmental purposes without the payment to us of any royalties thereon.

Field of the invention

This invention is in the class for coating apparatus in which a solid particulate material is supplied into a chamber made up of a housing surrounding the work and in which the atmosphere disperses a finely divided material.

Description of the prior art

Prior to our invention, the fluidized bed coater apparatus available included a ceramic porous disc for dispersing the air and separating the particulate resin from the lower pressure chamber. The use of a ceramic porous plate requires an extended time to be cleaned. The coating of several objects with different colors or different resins required an excessive amount of time. Also, the ceramic was comparatively fragile and expensive. A supply of such filters was required for speeded up operation or, more often, excessive time was expended rather than incur such an expense.

Prior fluidized bed coater apparatus had a one sized air suspension chamber and, since the amount of particulate material depends upon the volume of the air chamber, excessive amounts of material were used for small specimens.

Summary

When it is desired to coat an object by the use of a fluidized bed coating apparatus, this invention provides a series of spool shaped chamber size changing inserts so as to have a plurality of chamber sizes to accommodate differently sized specimens. A disposable filter paper porous disc is utilized for instantaneous change over to a different type of resin or a different color of resin. A plate with a plurality of holes therein distributes the pressure fluid under the porous plate to uniformly distribute the air and to float the particulate material evenly around the specimen to be coated.

These advantages result in a very efficient fluidized bed coater which uses a minimum amount of coating material and which requires a minimum amount of time to change specimens and coating materials.

It is an object of this invention to provide an improved fluidized bed coater.

Another object of this invention is to provide a fluidized bed coater utilizing a minimum amount of coating material regardless of specimum size.

Still another object of this invention is to provide a fluidized bed coater with a filter means that is readily changeable to accommodate for different coating materials.

A further object is to eliminate the inherent problems of the prior art.

The exact nature of this invention as well as other objects and advantages thereof will be readily apparent from consideration of the following specification relating to the annexed drawings in which:

Brief description of the drawings

The figure shows in plan view the apparatus of this invention.

Description of a preferred embodiment

Turning now to the drawing, the fluidized bed coater 10 has for its outside structure cylinder 11 and cylindrical tub 12 and is mounted on springs 13 on base 14. A vibrator 15 attached to the coater at a convenient location is also provided. A fluid pressure source 16 such as an air compressor, is connected through an air filter and drier 17 and then through a pressure regulator 18 through an air inlet 19 into the chamber formed by tub 12. Above the air inlet 19 is a plate 20 with holes therethrough for the distribution of the air. These holes are centered on circumferences of concentric circles. The air is distributed in such a manner that the particulate resin is evenly dispersed in the specimen chamber within the cylinder.

Above the plate 20 is a chamber which has for its top the hardware screen 21 with a filter paper 22 thereabove.

A protruding upper rim 24 on tub 12 is mated with a complementary lower rim 25 on cylinder 11 to hold screen 21 and filter paper 22 therebetween. A plurality of securing means 23 around the periphery of lips 24 and 25 assure an air tight seal.

Above the filter paper is a chamber in which the specimen 28 and the coating material 30 are placed. In order to utilize the minimum amount of coating material required for individual specimens, a series of spools 26 is provided. It is seen that the correct size chamber for the suspended coating material would result in the saving of two to twenty or more times the amount of used coating material. In order that the material does not enter the outer chamber formed by the spool, the bottom periphery is made to fit as snugly against the inner wall of cylinder 11 as possible. Further, the upper periphery of the spool extends outwardly so as to match the outer turned out edge of the top of the cylinder 11. A complete air tight seal is accomplished by securing the top of spool to the upper rim of cylinder 11 by a plurality of securing means 27 spaced around the periphery of the top of the spool.

A cover is supplied which fits over the top of cylinder 11 so as to keep out foreign matter when the coater is not in use. This cover can be in the nature of a refuse can lid.

What is claimed is:
1. In a fluidized bed coater,
first chamber means being substantially cylindrical in configuration and open topped and having a selected inner diameter with a first flange section on the open topped end thereof,
second chamber means being substantially cylindrical in configuration and open at both ends, said second means disposed in axial alignment with said first chamber means and atop said first chamber means, said second chamber means having an inner diameter substantially the same as said selected inner diameter of said first chamber means with a second flange section on the lower open end thereof, said second flange section adapted to mate in close fit relation with said first flange section of said first chamber means, disposable filter paper filtering means including support means therefor interposed said first and second chamber means, said filtering means having a diameter greater than said selected inner diameter such that said filtering means is interposed said first and second flange sections in sandwich relation, flange connection means for maintaining an air-tight seal between said filtering means and said first and second flange sections disposed external to said first and second chamber means, fluid pressure means connected to said first chamber means to apply fluid under pressure therein, insert means having a substantially cylindrical center section open at both ends with an inner diameter less than said selected inner diameter and a third flange section on the lower open end thereof, said insert means adapted for disposition in said second chamber means in close fit relation atop said filtering means such that pressurized fluid in said first chamber means which is filtered through said filtering means is channeled into said center section of said insert means, and means for maintaining said insert means immovable with respect to said first chamber means when fluid is applied under pressure to said first chamber means.

2. In the fluidized bed coater of claim 1, a perforated planar surface fluid distribution means having concentrically disposed rings of apertures therein and disposed within said first chamber means such that the output of said fluid pressure means passes therethrough.

References Cited

UNITED STATES PATENTS

| | | | |
|---|---|---|---|
| 3,073,437 | 1/1963 | Petryk | 118—429 X |
| 3,142,579 | 7/1964 | Brooks. | |
| 3,196,033 | 7/1965 | Brooks | 118—429 X |
| 3,197,328 | 7/1965 | Jung et al. | |
| 3,254,625 | 6/1966 | Armstrong | 118—429 X |
| 3,282,249 | 11/1966 | Ramsey | 118—429 X |
| 3,296,010 | 1/1967 | Craig et al. | |

WALTER A. SCHEEL, Primary Examiner

JOHN P. McINTOSH, Assistant Examiner